United States Patent
Jin (10) Patent No.: US 9,991,569 B2
(45) Date of Patent: Jun. 5, 2018

(54) BATTERY MODULE

(71) Applicant: SK Innovation Co., Ltd., Seoul (KR)

(72) Inventor: Ye Jin Jin, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 80 days.

(21) Appl. No.: 14/424,724

(22) PCT Filed: Aug. 29, 2013

(86) PCT No.: PCT/KR2013/007777
§ 371 (c)(1),
(2) Date: Feb. 27, 2015

(87) PCT Pub. No.: WO2014/035160
PCT Pub. Date: Mar. 6, 2014

(65) Prior Publication Data
US 2015/0221996 A1  Aug. 6, 2015

(30) Foreign Application Priority Data

Aug. 30, 2012 (KR) .................. 10-2012-0095350

(51) Int. Cl.
*H01M 10/613* (2014.01)
*H01M 10/6556* (2014.01)
*H01M 10/6555* (2014.01)

(52) U.S. Cl.
CPC ..... *H01M 10/613* (2015.04); *H01M 10/6555* (2015.04); *H01M 10/6556* (2015.04)

(58) Field of Classification Search
CPC ........... H01M 10/613; H01M 10/6555; H01M 10/6556
See application file for complete search history.

(56) References Cited

U.S. PATENT DOCUMENTS

| 2005/0282055 A1 | 12/2005 | Kim | |
| 2006/0214641 A1* | 9/2006 | Cho | H01M 10/4207 320/150 |
| 2008/0160395 A1* | 7/2008 | Okada | B60L 3/0046 429/99 |

(Continued)

FOREIGN PATENT DOCUMENTS

| JP | 8321329 A | 12/1996 |
| JP | 200692935 A | 4/2006 |

(Continued)

OTHER PUBLICATIONS

Machine translation of Korean Patent Publication No. 10-0776767, published Nov. 16, 2007.*

*Primary Examiner* — Sarah A. Slifka
*Assistant Examiner* — Lilia Nedialkova
(74) *Attorney, Agent, or Firm* — The Webb Law Firm (57) ABSTRACT

Provided is a battery module, wherein heat-radiating plates are coupled to a plurality of battery cells stacked and arranged in the battery module so as to be closely adhered to both surfaces of each of the battery cells, curved parts are formed on both sides of each of the heat-radiating plates, adjacent heat-radiating plates are formed to be spaced apart from each other by a predetermined distance, such that a volume change caused by expansion of the battery cell and a dimensional tolerance of the battery cell itself may be absorbed, and cooling performance may be improved.

7 Claims, 6 Drawing Sheets

(56) References Cited

U.S. PATENT DOCUMENTS

| | | | |
|---|---|---|---|
| 2009/0087727 A1* | 4/2009 | Harada | H01M 2/1077 |
| | | | 429/120 |
| 2010/0279152 A1 | 11/2010 | Payne | |
| 2010/0279154 A1* | 11/2010 | Koetting | H01M 10/425 |
| | | | 429/50 |
| 2011/0212355 A1* | 9/2011 | Essinger | H01M 2/1016 |
| | | | 429/120 |
| 2011/0293982 A1* | 12/2011 | Martz | H01M 10/613 |
| | | | 429/120 |
| 2011/0293983 A1* | 12/2011 | Oury | H01M 10/647 |
| | | | 429/120 |

FOREIGN PATENT DOCUMENTS

| | | |
|---|---|---|
| KR | 100776767 B1 | 11/2007 |
| KR | 1020120136750 A | 12/2012 |

* cited by examiner

BATTERY MODULE

CROSS-REFERENCE TO RELATED APPLICATIONS

This application is the United States national phase of International Application No. PCT/KR2013/007777 filed Aug. 29, 2013, and claims priority to Korean Patent Application No. 10-2012-0095350 filed Aug. 30, 2012, the disclosures of which are hereby incorporated in their entirety by reference.

TECHNICAL FIELD

The present invention relates to a battery module capable of absorbing a volume change and a dimensional tolerance of a battery cell and improving cooling performance.

BACKGROUND ART

In general, since a secondary battery may be charged and discharged unlike a primary battery, the secondary battery has been applied in various fields such as a digital camera, a mobile phone, a notebook, and a hybrid car, and research into the secondary battery has been actively conducted. As the secondary battery, there are a nickel-cadmium battery, a nickel-metal hydride battery, a nickel-hydrogen battery, and a lithium secondary battery. Further, among the above-mentioned secondary batteries, various researches into the lithium secondary battery having high energy density and discharge voltage have been conducted, and the lithium secondary battery has been commercialized and widely used.

In addition, the secondary battery is configured in a form of a battery module in which a plurality of battery cells are stacked due to a necessity for high power and high capacity. In this case, a temperature in the cell may be instantly increased due to generation of overcharge at the time of operation of the battery cell or generation of an internal short-circuit caused by a defect in a specific cell of the plurality of cells, or the like, such that gas is generated, thereby expanding a volume of the battery cell. In addition, it is difficult to assemble each of the battery cells due to dimensional tolerance at the time of manufacturing the battery cells. Therefore, a separate insulation pad is interposed between the battery cells, such that volume expansion and dimensional tolerance of the battery cell may be absorbed.

However, since the insulation pad interposed between the battery cells is heavy and expensive, in the case of the battery module or battery pack assembled by stacking a plurality of battery cells, an overall weight and cost may be further increased.

As the related art, "Battery systems, Battery Modules, and Method for Cooling Battery Module" has been disclosed in U.S. Patent Application Publication No. 20100279152.

DISCLOSURE

Technical Problem

An object of the present invention is to provide a battery module capable of absorbing a volume change caused by expansion of a battery cell and a dimensional tolerance of the battery cell itself and improving cooling performance without interposing an insulation pad between the battery cells.

Technical Solution

In one general aspect, a battery module includes: a plurality of battery cells stacked and arranged in parallel with each other so as to be spaced apart from each other by a predetermined distance; heat-radiating plates closely adhered to both surfaces of each of the battery cells and formed to protrude toward both sides of the battery cells; and supporters interposed between one pair of heat-radiating plates at both sides of each of the battery cells, respectively, wherein curved parts are formed at both sides of each of the heat-radiating plates, both ends of one pair of adjacent heat-radiating plates are closely adhered to each other, and closely adhered parts between both side curved parts are formed to be spaced part from each other by a predetermined distance.

The battery cell may be formed of two battery cells closely adhered to each other to thereby be paired with each other.

The curved parts of the heat-radiating plates may protrude outwardly in a direction in which the adjacent heat-radiating plates face each other.

Grooves may be formed in central portions of both sides of the supporter, such that plane parts formed at both sides of the curved parts of the heat-radiation plates may be formed to come in contact with the supporter.

The curved parts of the heat-radiating plates may protrude inwardly in a direction in which the adjacent heat-radiating plates face each other.

The curved parts may be formed to be staggered with each other.

The battery module may further include a cooling tube coupled to both ends of the heat-radiating plates and formed with a refrigerant channel.

Advantageous Effects

The battery module according to the present invention may absorb a volume change caused by expansion of a battery cell and dimensional tolerance of the battery cell itself and improve cooling performance.

In addition, since an insulation pad is not interposed between the battery cells, an overall weight and manufacturing cost of the battery module may be decreased.

DETAILED DESCRIPTION OF MAIN ELEMENTS

1000: battery module
100: battery cell
200: heat-radiating plate

210: curved part
220: closely adhered part
230: plane part
240: bent part
300: supporter
310: groove
400: cooling tube
410: refrigerant channel Best Mode Hereinafter, a battery module according to an exemplary embodiment of the present invention as described above will be described in detail with reference to the accompanying drawings.

Figure 1:
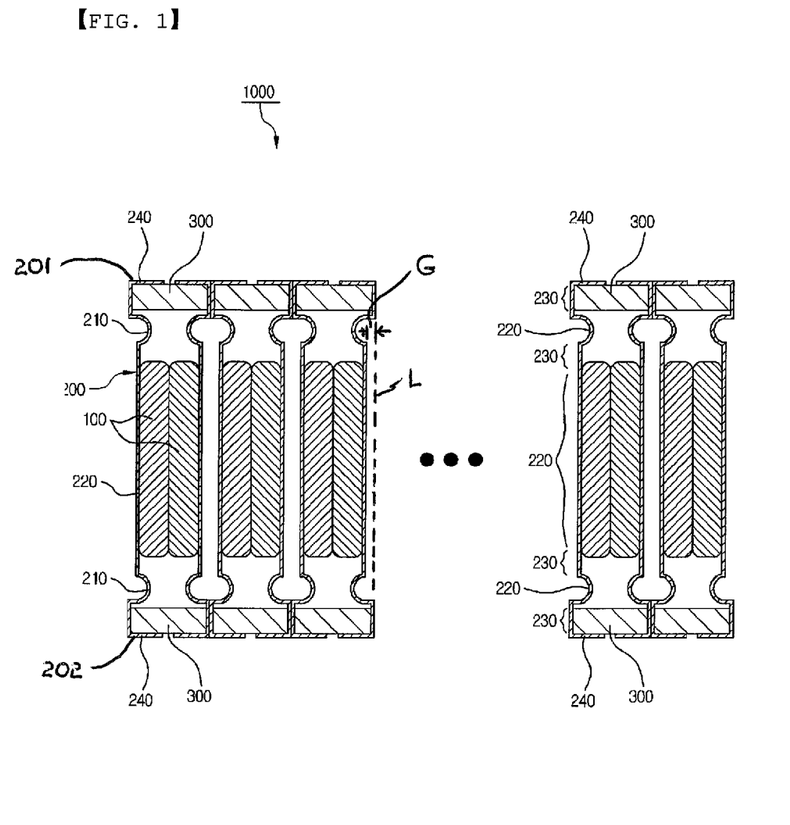
FIG. 1 is a cross-sectional view showing a battery module according to an exemplary embodiment of the present invention.
Figure 2:
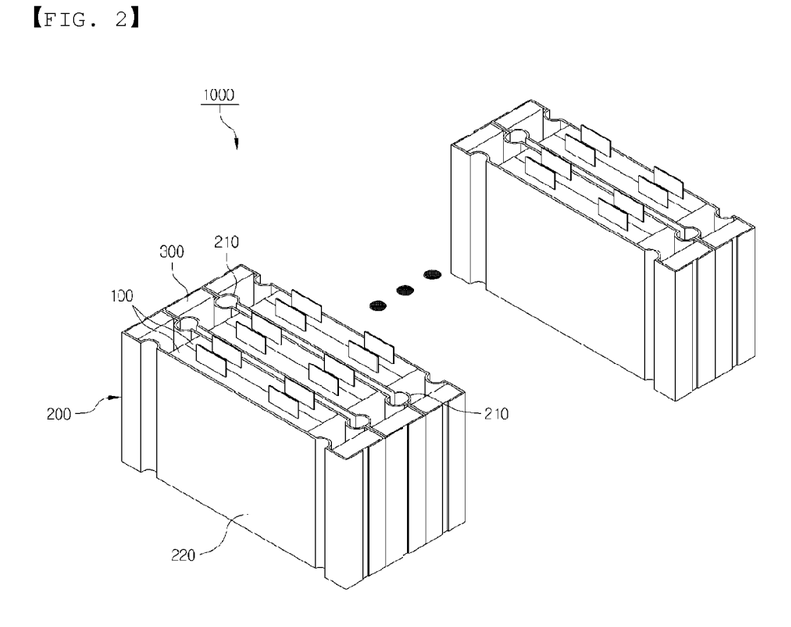
FIGS. 2 and 3 are assembly perspective views showing the battery module according to the exemplary embodiment of the present invention.
Figure 3:
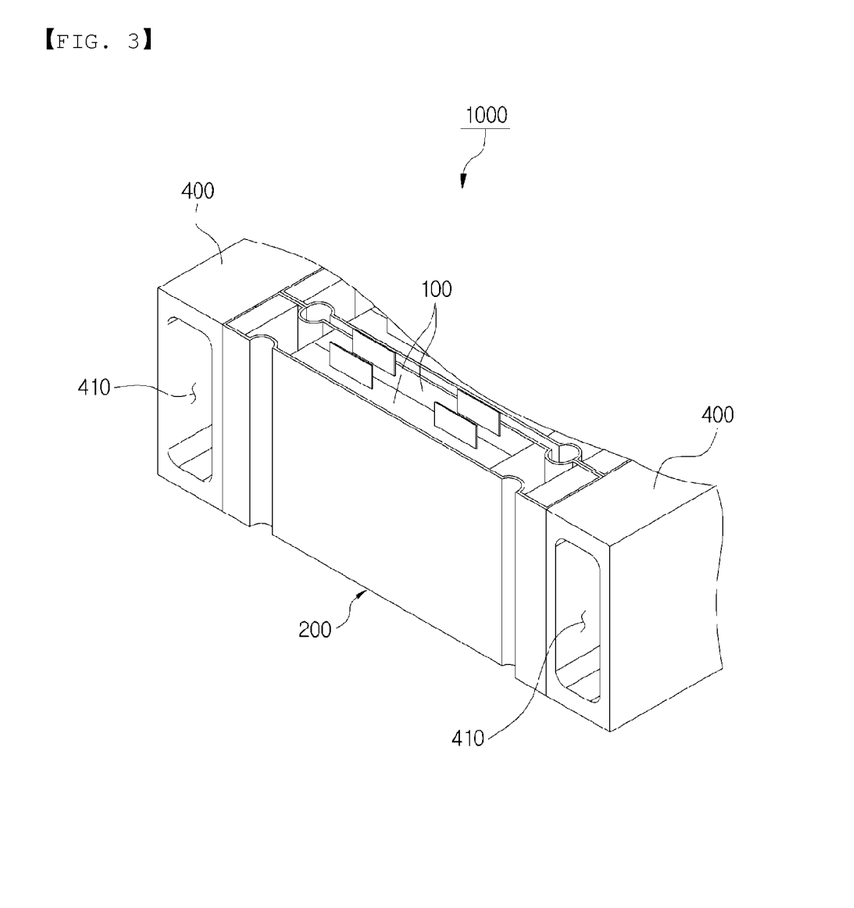

FIGS. 1 to 3 are a cross-sectional view and assembly perspective views showing the battery module according to the exemplary embodiment of the present invention.

As shown in FIGS. 1 to 3, a battery module 1000 according to the exemplary embodiment of the present invention includes: a plurality of battery cells 100 stacked and arranged in parallel with each other so as to be spaced apart from each other by a predetermined distance; heat-radiating plates 200 each having a first end 201 and a second end 202 and formed to be closely adhered to both side surfaces of each of the battery cells 100 and protrude toward both sides of the battery cells 100; and supporters 300 interposed between one pair of heat-radiating plates 200 at both sides of each of the battery cells 100, respectively, wherein curved parts 210 are formed at both sides of each of the heat-radiating plates 200, both ends of one pair of adjacent heat-radiating plates 200 are closely adhered to each other, and closely adhered parts 220 between both curved parts 210 are formed to be spaced apart from each other by a predetermined distance.

First, the battery cells 100 may be formed in parallel with each other in a plate shape so as to be spaced apart from each other by a predetermined distance, and electrode taps of the battery cells 100 may be electrically connected in series or parallel with each other. Further, in the battery cell 100, the electrode tap may be formed at one side of an electrode body, wherein the electrode body is a portion composed of a cathode, an anode, an electrolyte, and a separating plate separating the cathode and anode from each other and charged and discharged with electricity, and the electrode tap is a portion transferring a current generated in the electrode body at the time of discharge or a current introduced from the outside at the time of charge. In this case, the battery cell 100 may be a pouch type cell enclosed by a pouch to thereby be sealed, or have a form in which a case is coupled to an outer portion of a pouch type cell. In addition, the battery cell 100 may have a form in which a plurality of battery cells are stacked. In addition, the battery cell 100 may be formed of two battery cells 100 closely adhered to each other to thereby be paired with each other, and a plurality of pairs of battery cells 100 may be stacked and arranged so as to be spaced apart from each other by the predetermined distance. Hereinafter, the embodiment in which pairs of battery cells 100 are arranged so as to be spaced apart from each other as shown in FIGS. 1 and 2 is described.

The heat-radiating plates 200 are formed in a plate shape so as to be closely adhered to both surfaces of one pair of battery cells 100 and protrude toward both sides of the battery cells 100. That is, since the heat-radiating plates 200 are closely adhered to and coupled to both surfaces of one pair of battery cells 100, two heat-radiating plates 200 are positioned between one pair of battery cells 100 and another pair of battery cells 100 adjacent thereto. In addition, the heat-radiating plates 200 are formed to protrude toward both sides of the battery cell 100, such that heat generated during a charge and discharge process of the battery cells 100 is transferred through the heat-radiating plates 200 and cooled by a separate cooling unit coupled to both ends of the heat-radiating plates 200. In this case, the heat-radiating plates 200 may be made of a material having high heat conductivity such as aluminum or copper, and it is preferable that the heat-radiating plates 200 are made of a material capable of rapidly transferring heat generated in the battery cell 100.

The supporters 300 are interposed between and contact one pair of heat-radiating plates 200 at both sides of each of the battery cells 100, respectively, and serve to support both ends of the heat-radiating plates 200. In this case, the supporter 300 may have a shape in which the supporter 300 is formed to be long and has grooves formed therein so that the heat-radiating plates 200 may be inserted in addition to a shape in which each of the supporters 300 is interposed between one pair of heat-radiating plates 200, such that the supporter 300 may be integrally coupled to both ends of the heat-radiating plates 200.

As described above, the battery module 1000 roughly includes the battery cells 100, the heat-radiating plates 200, and the supporters 300.

In this case, the curved part 210 is formed at both sides of each of the heat-radiating plates 200. The curved part 210 may be formed in a U-letter shape at both sides of the closely adhered part 220 at which the heat-radiating plate 200 is closely adhered to the battery cell 100. Alternatively, the curved part 210 may be formed in various shapes such as a wrinkled shape, and the like, as well as the U-letter shape.

In addition, one pair of adjacent heat-radiating plates 200 are formed so that both ends thereof are closely adhered to each other and the closely adhered parts 220 between the both side curved parts 210 are spaced apart from each other by the predetermined distance. That is, two heat-radiating plates 200 are positioned between one pair of battery cells 100 and another pair of battery cells 100 adjacent thereto, and in the two adjacent heat-radiating plates 200, plane parts 230 extended outwardly from both side curved parts 210 relative to the closely adhered parts 220 and are formed to come in contact with each other, and the plane parts 230 extended inwardly from the curved parts 210 and the closely adhered parts 220 are formed to be spaced apart from each other. As a result, a line L extending between each pair of extension parts defines a gap G with the closely adhered part 220. Therefore, the closely adhered part 220 of the heat-radiating plate 200 is closely adhered to the battery cell 100, and the plane parts 230 of both ends of the adjacent heat-radiating plates 200 come in contact with each other to thereby be supported by each other. However, the closely adhered parts 220 of pairs of adjacent battery cells do not contact one another. Here, the supporter 300 may be interposed so as to come in contact with the plane parts 230 extended outwardly from the curved part 210 of the heat-radiating plate 200 to thereby closely adhere the plane parts 230 of the two adjacent heat-radiating plates 200 to each other.

In addition, both ends of the heat-radiating plate 200 are formed to protrude outwardly of the supporter 300, and perpendicularly bent, thereby forming bent parts 240. That is, two battery cells 100 are closely adhered to each other, one pair of heat-radiating plates 200 may be closely adhered to both surfaces thereof, and the supporter 300 may be interposed between the curved part 210 and the bent part 240 formed at both ends of the heat-radiating plates 200. In addition, as shown in FIG. 3, a separate cooling unit may be coupled to the bent parts 240 of the heat-radiating plates 200, wherein as the cooling unit, a cooling tube 400 formed with a refrigerant channel 410 in which a refrigerant or coolant flows may be formed.

Figure 4:
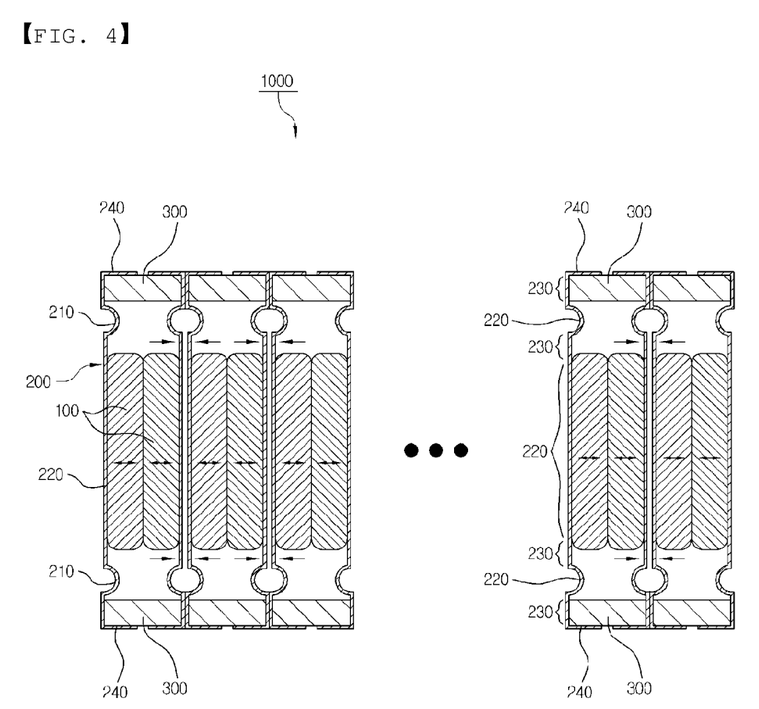
FIG. 4 is a cross-sectional view showing a state in which a battery cell of FIG. 1 is expanded.

Therefore, since the closely adhered parts 220 of the adjacent heat-radiating plates 200 closely adhered to the battery cells 100 are spaced apart from each other by the predetermined distance to form a space, dimensional tolerances of the battery cells 100 may be absorbed, and when the battery cells 100 are expanded as shown in FIG. 4, a gap between the closely adhered parts 220 of the adjacent heat-radiating plates 200 is decreased, such that a volume change in a direction in which the battery cells 100 are stacked and arranged may be absorbed. In this case, even though the battery cells 100 are expanded, a state in which the closely adhered parts 220 of the heat-radiating plates 200 are closely adhered to the battery cells 100 may be maintained due to elasticity of the curved parts 210 of the heat-radiating plates 200. Further, even though the volume of the battery cell 100 is decreased, the closely adhered part 220 of the heat-radiating plate 200 may be recovered in an original shape thereof in a state in which it is closely adhered to the battery cell 100.

That is, since the heat-radiating plate 200 may absorb the dimensional tolerance and the volume change in a state in which it is closely adhered to the battery cell 100, deterioration of cooling performance of the battery cell 100 or generation of a cooling performance deviation between each of the battery cells 100 may be prevented.

Further, since the space exists between the adjacent heat-radiating plates 200, cooling air may be allowed to flow through this space. Therefore, since a water-cooling method and an air-cooling method are simultaneously used, cooling performance may be improved.

In addition, since a separate insulation pad capable of absorbing a volume change between two battery cells 100 may not be used, an overall weight and manufacturing cost of the battery module may be decreased.

In addition, the battery cell 100 may be formed of two battery cells closely adhered to each other to thereby be paired with each other. The battery cells 100 are formed in a form in which two battery cells 100 are interposed between two heat-radiating plates 200 to thereby be closely adhered to each other, and the cooling performance deviation between the battery cells 100 may be decreased by cooling heat generated in one battery cell 100 through one heat-radiating plate 200.

Further, the curved parts 210 of the heat-radiating plates 200 may be formed to protrude outwardly in a direction in which adjacent heat-radiating plates 200 face each other. In other words, the curved parts 210 are formed to protrude in a direction in which two battery cells 100 are closely adhered to each other as shown in FIG. 1, and since a space is formed at both sides of the battery cell 100 by a thickness of the battery cell 10 itself, the curved parts 210 of the heat-radiating plates 200 may be easily formed using this space. That is, when the curved parts 210 are formed to be symmetrical to each other, even though the battery cells 100 are expanded, the curved parts do not interfere with each other, and a height of the curved parts 210 may be increased by a thickness of the battery cell 100. In addition, since the curved parts 210 of the heat-radiating plates 200 may be formed to be symmetrical to each other, portions of the heat-radiating plates 200 protruding toward both sides of the battery cells 100 may be formed to be short, thereby making it possible to decrease a size of the battery module.

Figure 5:
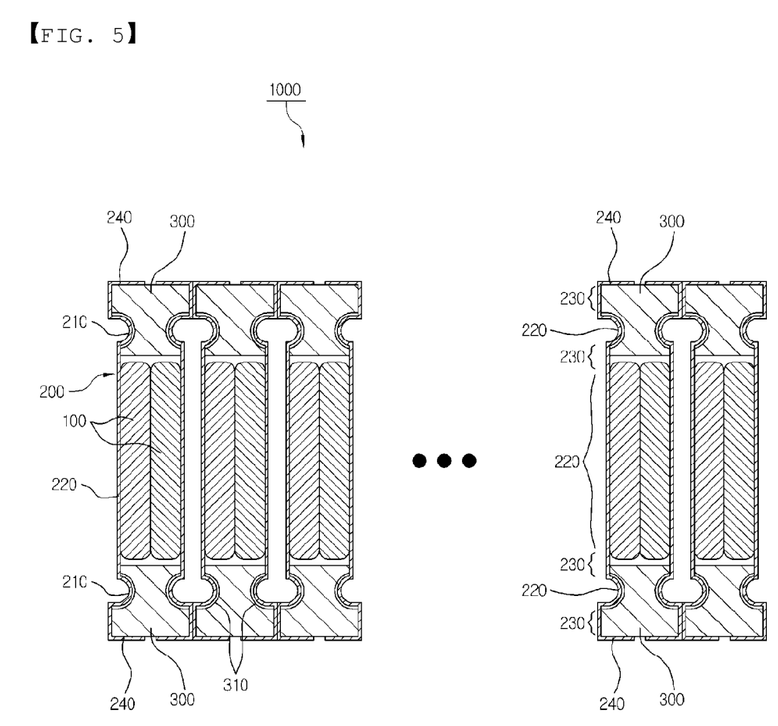
FIG. 5 is a cross-sectional view of an example of a supporter according to the present invention.

Further, grooves 310 are formed in central portions of both sides of the supporter 300, such that the plane parts 230 formed at both sides of the curved parts 210 of the heat-radiating plate 210 are formed to come in contact with the supporter 300. That is, as shown in FIG. 5, the grooves 310 are formed to accommodate the curved parts 210 of the heat-radiating plates 200, such that the plane parts 230 extended from both sides of the curved parts 210 of the heat-radiating plates 200 may be formed to be supported by the supporters 300. In this case, outer portions of curved parts 210 of adjacent heat-radiating plates 200 are supported in a state in which they are closely adhered to each other but inner portions of the curved parts 210 are supported by the supporter in a state in which they are spaced apart from each other by a predetermined distance. This is to prevent the battery cells 100 from shaking in a stacked direction in a state in which the battery cells 100 are assembled as the battery module, and to prevent the battery cells 100 from being biased toward one side in the stacked direction due to accumulation of thickness expansion when the volumes of the battery cells 100 are expanded. Therefore, deformation or damage of the curved parts 210 of the heat-radiating plates 200 may be prevented.

Figure 6:
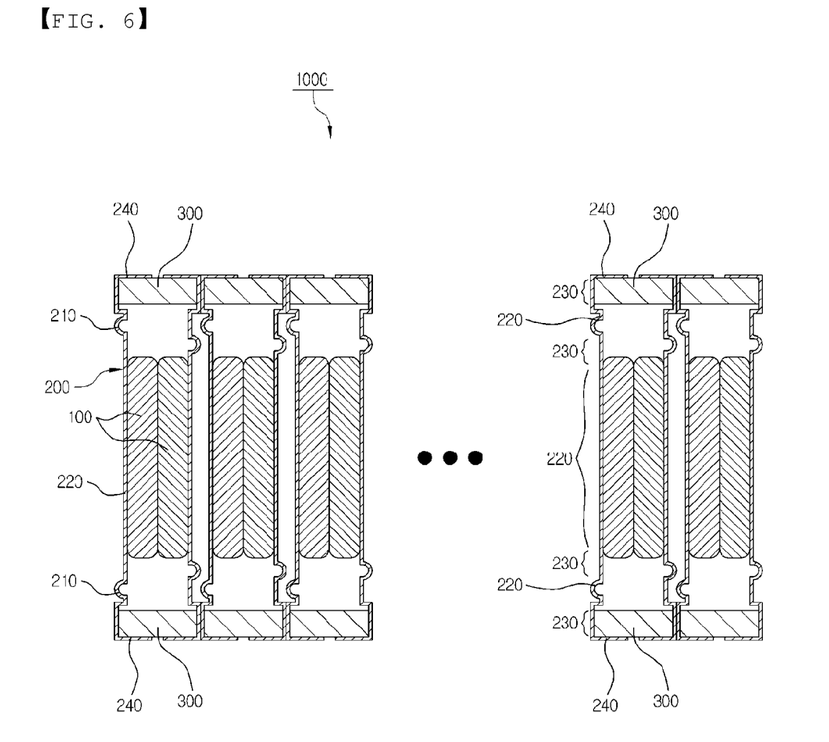
FIG. 6 is a cross-sectional view showing a battery module according to another exemplary embodiment of the present invention.

Further, the curved parts 210 of the heat-radiating plates 200 may be formed to protrude inwardly in a direction in which adjacent heat-radiating plates 200 face each other. This means that the curved parts 210 are formed to protrude in the direction in which two adjacent heat-radiating plates 200 face each other as shown in FIG. 6. In this case, it is preferable that the curved parts 210 are formed to have a height smaller than a thickness of a spaced space between the heat-radiating plates 200, and to be staggered with each other. That is, the curved parts 210 may be formed using the space between the heat-radiating plates 200, and it is preferable that the curved parts 210 are formed to have a low height or to be staggered with each other so that the curved parts 210 do not interfere with each other when volumes of the battery cells 100 are expanded.

In addition, the cooling tube 400 may be coupled to both ends of the heat-radiating plates 200, and the refrigerant channel 410 is formed in the cooling tube 400 so that the refrigerant or coolant flows therethrough, such that a water-cooling type cooling method may be applied. In this case, a cooling pin may be formed in the refrigerant channel 410 of the cooling tube 400 in a wrinkled shape or flat plate shape in order to increase cooling efficiency.

Further, it is preferable that the heat-radiating plate 200 is made of a material having high elasticity so as to absorb the volume change of the battery cell 100 and having high heat conductivity in order to cool the battery cell 100. In addition, since the supporter 300 comes in contact with the heat-radiating plate 200, heat generated in the battery cell 100 may be partially transferred and cooled through the supporter 200 by using a material having excellent heat conductivity in the supporter 300. Further, the supporter 200 and the cooling tube 400 may be formed integrally with each other and then coupled to the heat-radiating plate 200, or the supporter 300 and the cooling tube 400 are formed by insert-molding using a heat conductive plastic material so as to include the bent part 240 of the heat-radiating plate 200, thereby making it possible to improve cooling performance.

The present invention is not limited to the above-mentioned exemplary embodiments but may be variously applied, and may be variously modified by those skilled in the art to which the present invention pertains without departing from the gist of the present invention claimed in the claims.

The invention claimed is:

1. A battery module comprising:
    a plurality of battery cells arranged in parallel with each other so as to be spaced apart from each other by a predetermined distance;
    wherein each battery cell includes:
    a) a first heat-radiating plate having a first end and a second end and including a first closely adhered part therebetween closely adhered to a first surface perpendicular to a thickness direction of the battery cell, a first extension part at the first end of the first heat-radiating plate and a second extension part at the second end of the first heat-radiating plate with each extending from a respective end of the first closely adhered part;
    b) a second heat-radiating plate having a first end and a second end and including a second closely adhered part therebetween closely adhered to a second surface perpendicular to a thickness direction of the battery cell, a third extension part at the first end of the second heat-radiating plate and a fourth extension part at the second part of the second heat-radiating plate with each part extending from a respective end of the second closely adhered part;
    c) a first supporter interposed between and contacting the first extension part and the third extension part;
    d) a second supporter interposed between and contacting the second extension part and the fourth extension part; and
    e) wherein each of the first, second, third, and fourth extension parts includes a curved part and a plane part that is disposed by the curved part outwardly relative to the closely adhered part and is parallel to the respective closely adhered part such that a line extending between each pair of extension parts defines a gap with that closely adhered part,
    wherein the first supporter is interposed between the plane part of the first extension part and the plane part of the third extension part,
    wherein the second supporter is interposed between the plane part of the second extension part and the plane part of the fourth extension part,
    wherein as a result of the gap a distance in the thickness direction between the plane part of the first extension part and the plane part of the third extension part and a distance in the thickness direction between the plane part of the second extension part and the plane part of the fourth extension part are larger than a distance in the thickness direction between the first closely adhered part and the second closely adhered part, and
    wherein for at least one of the battery cells, the plane part of the first extension part is in contact with a plane part of a third extension part of an adjacent battery cell and the plane part of the second extension part is in contact with a plane part of a fourth extension part of the adjacent battery cell, so that the first and second closely adhered parts of adjacent battery cells are separated by the gaps of each battery cell and not in contact.

2. The battery module of claim 1, wherein the battery cell is formed of two battery cells closely adhered to each other to thereby be paired with each other.

3. The battery module of claim 1, wherein for each battery cell the curved part of the first extension part protrudes outwardly in a direction in which the curved part of the third extension part is located,
    the curved part of the second extension part protrudes outwardly in a direction in which the curved part of the fourth extension part is located,
    the curved part of the third extension part protrudes outwardly in a direction in which the curved part of the first extension part is located, and
    the curved part of the second extension part protrudes outwardly in a direction in which the curved part of the second extension part is located.

4. The battery module of claim 3, wherein for each battery cell the first supporter is interposed not only between the plane part of the first extension part and the plane part of the third extension part but also between the curved part of the first extension part and the curved part of the third extension part, and
    the second supporter is interposed not only between the plane part of the second extension part and the plane part of the fourth extension part but also between the curved part of the second extension part and the curved part of the fourth extension part.

5. The battery module of claim 1, wherein for at least one of the battery cells the curved part of the first extension part protrudes outwardly in a direction in which the curved part of the third extension part of the one adjacent battery cell is located,
    the curved part of the second extension part protrudes outwardly in a direction in which the curved part of the fourth extension part of the one adjacent battery cell is located,
    the curved part of the third extension part protrudes outwardly in a direction in which the curved part of the first extension part of the other adjacent battery cell is located, and
    the curved part of the fourth extension part protrudes outwardly in a direction in which the curved part of the second extension part of the other adjacent battery cell is located.

6. The battery module of claim 5, wherein each of the curved parts on adjacent radiating plates is formed to be staggered with each other.

7. The battery module of claim 1, further comprising a cooling tube coupled to both ends of the heat-radiating plates and formed with a refrigerant channel.

* * * * *